May 1, 1934.    J. J. VAN KLEEK    1,956,937
ANIMAL EXERCISER
Filed Feb. 4, 1933    2 Sheets-Sheet 1
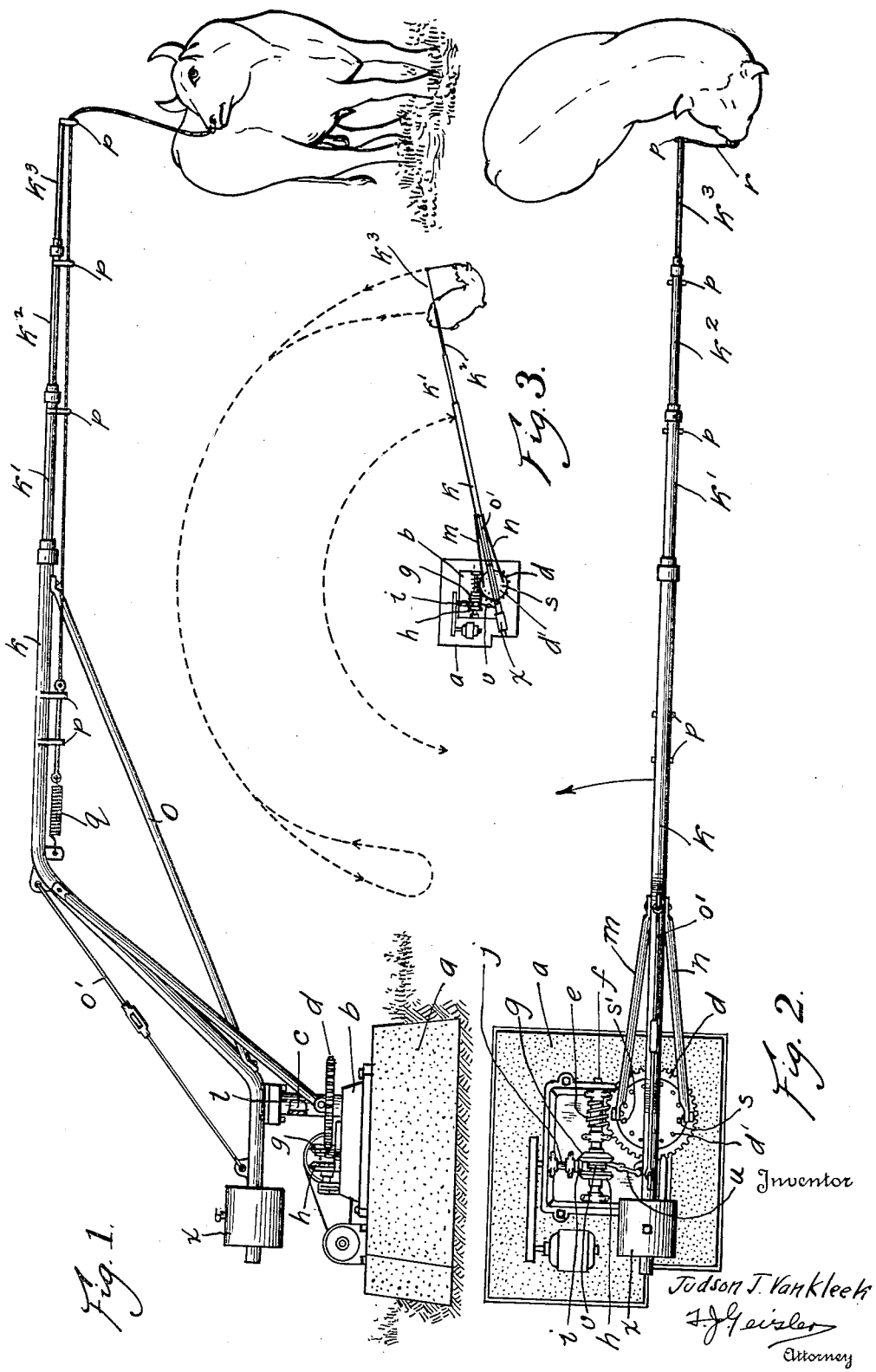

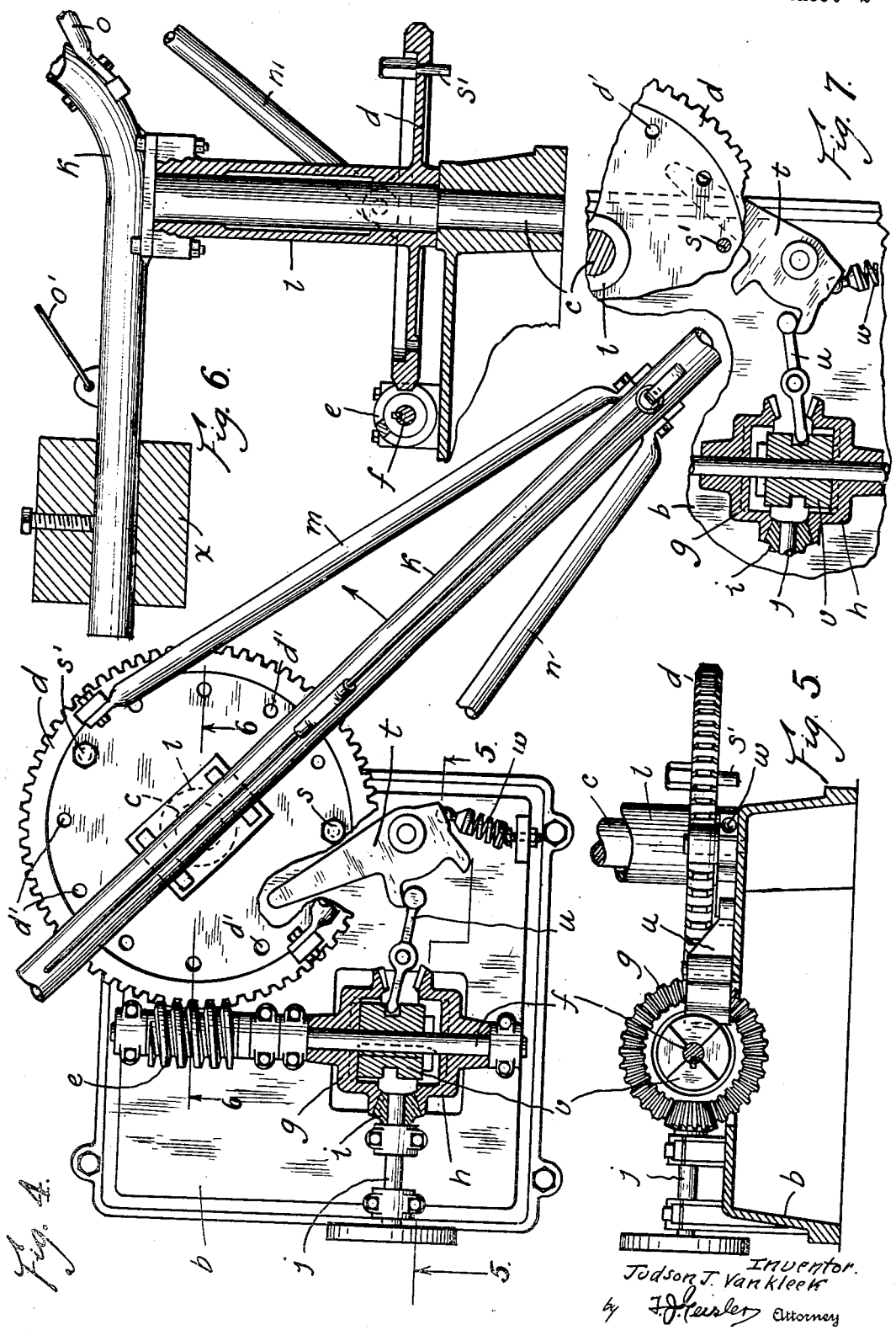

Patented May 1, 1934

1,956,937

UNITED STATES PATENT OFFICE 1,956,937

ANIMAL EXERCISER

Judson J. Van Kleek, Beaverton, Oreg.

Application February 4, 1933, Serial No. 655,213

4 Claims. (Cl. 119—117)

Dairymen and stock breeders are confronted with the problem of giving the bulls of their herd proper and sufficient exercise. Without such exercise the bull may become unmanageable so as to be a constant source of danger and annoyance. Besides, improper or insufficient exercise has a tendency to render the bulls slow and logy, especially such as have to be kept in cramped quarters; and it also affects the breeding efficiency of the animal.

The object of my invention is to provide an inexpensive and simple device which, in a general way, may be said to consist of an arm revolved in a horizontal plane by convenient means, the direction being constantly, automatically reversed when the arm has been revolved in one direction a predetermined segment of a circle; and the degree of revolution being adjustable.

The animal is fastened to the extremity of the revolved arm by a lead rope. The connection of the lead rope is such as to eliminate any danger of harming or irritating the animal by severe jerking; such jerking in the case of a bull having a ring inserted in his nose, might jerk out such ring.

The arm is revolved at such height and is of such length that the animal may freely pass beneath it without danger of tangling the lead rope with the arm. This arrangement makes it possible to reverse the exerciser without interfering with the movements of the animal.

The details of construction and the mode of operation of my animal exerciser are hereinafter fully described with reference to the accompanying drawings.

In such drawings:

Fig. 1 shows an elevation of my animal exerciser illustrating its arrangement and operation;

Fig. 2 shows a plan or top view corresponding with Fig. 1;

Fig. 3 shows a smaller scale diagrammatic view illustrating how my device may be adjusted so that the arm thereof makes a sweep of only half a circle in any one direction, and then is automatically reversed. It further illustrates the effect of leading the animal in one direction and then reversing the lead;

Fig. 4 shows a partial plan view with parts in section, of one embodiment of means whereby my invention is carried into practice;

Fig. 5 shows a fragmentary sectional elevation of the devices shown in Fig. 4; and Figs. 6 and 7 show details, partly in section, illustrating structural features of my device.

My exercising machine consists of a base $a$ which may be of concrete (or wood if the exercising machine is to be moved from one place to another). On the base $a$ is mounted a block $b$ in which is journaled for rotation a short vertical shaft $c$. On this shaft is mounted a worm wheel $d$ which meshes with a worm $e$ carried by a horizontal shaft $f$. On this shaft are loosely mounted opposite spur gears $g, h$, which mesh with a spur pinion $i$ fast on a shaft $j$ which is driven by any convenient means, for example, an electric or gas motor.

On the vertical shaft $c$ is mounted a horizontally extending arm $k$. To support the arm the worm wheel $d$ may be made with a hub $l$, as illustrated by Figs. 5 and 6. In order to brace the inner end of the arm $k$ brace rods $m, n$ may be provided supporting the arm on the worm wheel; and the bend in the arm may be supported by a strut rod $o$, and an adjustable tie rod $o'$.

The extremity of the arm should be more or less resilient so as to eliminate all rigidity and not exert a hard pull on the animal when the arm has reached the length of its sweep in one direction and is leading the animal to reverse its walk in the opposite direction. Such resiliency may be attained by constructing the outer end of the arm of reducing sections, as shown by $k'$, $k^2$ and $k^3$ in Fig. 1. The lead rope $r$ carried by the arm may be supported thereon thru rings $p$.

The inner end of the lead rope should be fastened to the arm by a strong spring $q$ which provides ample play for the animal when urged to start, stop or turn by the revolution of the arm $k$ in reverse directions.

The reversal of the revolution of the arm is accomplished by means of a trip lever $t$ which operates a rocker $u$ and the latter sliding the clutch element $v$ in opposite directions on the shaft $f$; the trip lever retained in one position or the other by a spring $w$ as more clearly shown in Fig. 4.

The arm $k$ is preferably counter-balanced by a weight $x$ as shown in Figs. 1 and 2; and the worm wheel $d$ is provided with a series of spaced holes $d'$ in which are movably inserted pins $s$ and $s'$, which pins on coming into contact with the trip lever $t$ trip the same as illustrated in Figs. 4 and 7, and thus slide the clutch element $v$ into engagement with one or the other of the gears $g, h$ to drive the worm $e$ in one or the other direction.

The operation of my exerciser is evident from the description above given. The alternate reversing of the direction of the sweep of the arm k effects throwing into play the muscles of the animal's back and loins. It exercises, in short, his whole mid-section.

Besides its use as described, my machine has also been found to serve as ideal means for quieting animals which have an ugly or quarrelsome disposition. My machine has been fully tested out in the agricultural department of the Oregon State College. In the test there made a Jersey bull of rather ugly temper was led to and fro by my machine for a period of twenty minutes. At the end of such time he still manifested ugliness, but upon his exercise by my machine being continued for another forty minutes the animal was calmed down to such an extent that he could be led back to the barn as gentle as a calf.

In short, my machine may be effectively used for taming unruly bulls or cattle without irritating their tempers or injuring them in any manner, for injury to them is prevented by arranging the arm at such height above the ground and making the same of such length—fifteen feet in length has been found very practical—that the animal may pass under the arm when turned about by the lead rope without the latter becoming entangled with the arm. And furthermore, injury to the animal is provided against by making the extremity of the arm springy and providing some give in the pull on the lead rope.

As evident from the above described construction, instead of providing one arm in my machine it could be provided with two arms extending in opposite directions from each other; and with such construction two animals may be led to and fro for exercise by my machine; the animals being led in opposite directions, and at a considerable distance from each other.

I claim:

1. An animal exerciser comprising, an arm mounted for revolving in a horizontal plane, a motor revolving said arm, the driving connection between the motor and the arm including reversing means operated by revolving the arm a predetermined distance in one direction, the length of said arm and its plane of rotation being adapted to permit the animal to pass under the arm, and a lead rope extending from the extremity of the arm.

2. An animal exerciser comprising, an arm mounted for revolving in a horizontal plane, a motor revolving said arm, the driving connection between the motor and the arm including reversing means operated by revolving the arm a predetermined distance in one direction and adjustable to vary the degree of revolution, the length of said arm and its plane of rotation being adapted to permit the animal to pass under the arm, a lead rope extending from the extremity of the arm and means providing yielding of the lead rope.

3. In an animal exerciser, a base, a vertical shaft rotatably mounted in said base, a horizontal arm carried by said shaft, means for rotating the arm in opposite directions, comprising a worm-wheel carried by the shaft, a motor-driven worm, the driving means including a reversing clutch operated by a trip-lever, and a movable pin carried by the worm-wheel operating said trip-lever.

4. In an animal exerciser, a base, a vertical shaft rotatably mounted in said base, a horizontal arm carried by said shaft, means for rotating the arm in opposite directions, comprising a worm-wheel carried by the shaft, a motor-driven worm, the driving means including a reversing clutch operated by a trip-lever, a movable pin carried by the worm-wheel operating said trip-lever, and lateral brace rods tying the arm to said worm-wheel.

JUDSON J. VAN KLEEK.